(12) United States Patent
Liu et al.

(10) Patent No.: US 11,231,439 B2
(45) Date of Patent: Jan. 25, 2022

(54) VERTICAL SUPERCONDUCTING MAGNETIC MASS-SPRING OSCILLATOR WITH ADJUSTABLE NATURAL FREQUENCY

(71) Applicant: Huazhong University of Science and Technology, Hubei (CN)

(72) Inventors: Xiangdong Liu, Hubei (CN); Jun Luo, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 254 days.

(21) Appl. No.: 16/688,511

(22) Filed: Nov. 19, 2019

(65) Prior Publication Data

US 2020/0103435 A1 Apr. 2, 2020

Related U.S. Application Data

(63) Continuation of application No. PCT/CN2019/085705, filed on May 6, 2019.

(30) Foreign Application Priority Data

May 16, 2018 (CN) .......................... 201810468722.8

(51) Int. Cl.
*G01P 15/105* (2006.01)
*G01P 15/08* (2006.01)

(52) U.S. Cl.
CPC .... *G01P 15/105* (2013.01); *G01P 2015/0857* (2013.01)

(58) Field of Classification Search
CPC ........... G01P 15/105; G01P 2015/0857; G01P 15/132
See application file for complete search history.

(56) References Cited

U.S. PATENT DOCUMENTS

2017/0276827 A1 9/2017 Gulian et al.
2018/0068773 A1 3/2018 Zhu et al.

FOREIGN PATENT DOCUMENTS

| CN | 102253675 | 11/2011 |
| CN | 102901556 | 1/2013 |

(Continued)

OTHER PUBLICATIONS

International Search Report for corresponding PCT/CN2019/085705, dated Jun. 27, 2019, 6 pages, English translation provided.

*Primary Examiner* — Xin Y Zhong
(74) *Attorney, Agent, or Firm* — Hamre, Schumann, Mueller & Larson, P.C.

(57) ABSTRACT

The present disclosure discloses a vertical superconducting magnetic mass-spring oscillator with an adjustable natural frequency, comprising: a proof mass, a negative-stiffness superconducting coil and a positive-stiffness superconducting coil; the negative-stiffness superconducting coil is mounted at an opening of a semi-closed space of the proof mass, so that a part of magnetic lines of the negative-stiffness superconducting coil are in a compressed state in a closed space of the proof mass, and the other part of the magnetic lines of the negative-stiffness superconducting coil are in an expanded state outside the closed space of the proof mass; a vertical magnetic repulsive force applied to the proof mass by the negative-stiffness superconducting coil varies with a displacement of the proof mass from an equilibrium position, with the variation magnitude proportional to the displacement and the variation direction the same as the displacement direction; and the positive-stiffness superconducting coil is mounted in the semi-closed space of the proof mass, and a vertical magnetic repulsive force applied to the proof mass by the positive-stiffness superconducting coil varies proportionally to the displacement of the proof mass from the equilibrium position, with (Continued)

the variation direction opposite to the displacement direction. The present disclosure realizes that the natural frequency of the superconducting mass-spring oscillator is adjustable, and meanwhile, the cross-coupling effect of horizontal and vertical degrees of freedom of the proof mass can be reduced.

6 Claims, 3 Drawing Sheets

(56) References Cited

FOREIGN PATENT DOCUMENTS

| | | |
|---|---|---|
| CN | 105738963 | 7/2016 |
| CN | 108918913 | 11/2018 |

VERTICAL SUPERCONDUCTING MAGNETIC MASS-SPRING OSCILLATOR WITH ADJUSTABLE NATURAL FREQUENCY

BACKGROUND

Technical Field

The present disclosure relates to the field of inertial sensing, and more particularly to a vertical superconducting magnetic mass-spring oscillator with an adjustable natural frequency.

Description of the Related Art

Inertial sensors are widely used in the fields of navigation, gravity measurement, motion control and the like. The mass-spring oscillator is the core component for constructing various inertial sensors. At low temperature, by using the Meissner-state superconductor as a proof mass, a mass-spring oscillator—a superconducting magnetic mass-spring oscillator can be constructed by the magnetic interaction between the superconducting current-carrying coil and the Meissner-state superconductor.

The superconducting magnetic mass-spring oscillator has the following outstanding advantages:

(1) The thermal noise is low. The mass-spring oscillator works at a low temperature of 4.2 K; the full levitation of the proof mass can be achieved without mechanical connection, so that the mass-spring oscillator has only residual gas damping, and the quality factor (Q value) is high; and the superconducting coil constructing the oscillator is in a zero resistance state. These factors determine that the thermal noise of the mass-spring oscillator is much lower than that of the conventional vibrator.

(2) An inertial sensor can be constructed by using high-resolution displacement sensing technology based on superconducting quantum interference device (SQUID), which greatly reduces the instrument noise of the sensor.

Thermal noise and instrument noise constitute the fundamental noise of an inertial sensor, and are the physical limit of measurement resolution. Because of its low noise level, expensive superconducting magnetic mass-spring oscillators have been used to construct ultra-high resolution inertial sensors, and have important applications in high-resolution gravity measuring instruments. A superconducting gravimeter developed by US GWR Inc. is recognized as the best instrument for measuring time-varying gravity due to its low noise (0.1-0.3 $\mu$Gal/$\sqrt{Hz}$@1-20 mHz, noise in other frequency bands is better than the station seismic noise), wide dynamic range and low drift ($\mu$Gal/yearly). With the instrument, scientists have achieved a lot of research results, which strongly promote the research of geodynamics and geophysics. At present, many international organizations are developing a high-resolution gravity gradiometer based on a superconducting magnetic mass-spring oscillator. It is expected that such instrument can break through the resolution bottleneck of aviation gravity gradient measurement and realize resource exploration for larger depth and smaller ore bodies. The core components of the superconducting gravimeter and the superconducting gravity gradiometer are superconducting accelerometers, and the superconducting magnetic mass-spring oscillator is one of the core components of the superconducting accelerometer.

At present, there are two typical methods for constructing a vertical superconducting magnetic mass-spring oscillator with the proof mass fully levitated. The first method, represented by the superconducting gravimeter of the US GWR Inc., uses a hollow niobium ball as a proof mass, and uses several sets of superconducting solenoid coils to generate a small gradient magnetic field so as to enable levitation of the proof mass. The disadvantages of this method are that the mass-spring oscillator has a complicated structure, the hollow niobium ball is difficult to process, and more importantly, due to its spherical geometry, the vertical and horizontal motions of the proof mass are coupled by the magnetic field, bringing about severe cross-coupling effect, and thus, this method is not suitable for application in dynamic environments. The second method use a non-spherical proof mass such as a circular barrel or square barrel with an intermediate partition, in which the levitating magnetic field is provided by a single-layer tightly wound disc type superconducting coil below the partition inside the barrel, and with the Meissner effect of the superconducting proof mass, the magnetic field of the vertical superconducting coil is enclosed in the barrel. Thus, outside the barrel-type proof mass, a superconducting coil can be placed adjacent to the outer sidewall of the proof mass, without generating the serious magnetic field coupling, and then the superconducting coil outside the barrel is further utilized to perform feedback control of the horizontal linear degree of freedom motion and rotational degree of freedom motion of the proof mass, thereby further reducing the cross-coupling effect. The magnetic mass-spring oscillator constructed by the second method has good dynamic environment applicability and has been applied to a mobile platform superconducting gravity gradiometer. However, when constructing a vertical superconducting magnetic mass-spring oscillator using the second method characterized by the barrel-type proof mass, the single-layer tightly wound disc type superconducting coil in the barrel generates a large magnetic field gradient, and the mass-spring oscillator has a large stiffness and a high natural frequency, resulting in that the transfer function from acceleration to displacement is small, the temperature sensitivity coefficient is large, and the instrument noise is high. For instruments such as a gravimeter and a gravity gradiometer that use low-frequency signals as the measurement object, the adverse effects cannot be underestimated.

SUMMARY

In view of the above-described defects in the art, the present disclosure aims to solve the following technical problems: when a hollow niobium ball is used as a proof mass, the hollow niobium ball is difficult to process, and the vertical and horizontal motions of the proof mass are coupled by the magnetic field, bringing about severe cross-coupling effect; and when a non-spherical proof mass is used, the single-layer tightly wound disc type superconducting coil in the barrel generates a large magnetic field gradient, and the mass-spring oscillator has a large stiffness and a high natural frequency, resulting in that the transfer function from acceleration to displacement is small, the temperature sensitivity coefficient is large, and the instrument noise is high.

In order to achieve the above objective, the present disclosure provides a vertical superconducting magnetic mass-spring oscillator with an adjustable natural frequency, comprising a proof mass, a negative-stiffness superconducting coil and a positive-stiffness superconducting coil.

The proof mass, the negative-stiffness superconducting coil and the positive-stiffness superconducting coil are all made of superconducting material, and the proof mass is a semi-closed barrel with an intermediate partition; magnetic repulsive forces between the negative-stiffness superconducting coil and the positive-stiffness superconducting coil and the proof mass balance the gravity of the proof mass to allow magnetic levitation of the proof mass; each of the magnetic repulsive forces is a function of displacement of the proof mass, and a resultant force of the magnetic forces and the gravity applied to the proof mass has the property of restoring force; the negative-stiffness superconducting coil is mounted at an opening of a semi-closed space of the proof mass, so that a part of magnetic lines of the negative-stiffness superconducting coil are in a compressed state in the semi-closed space of the proof mass, and the other part of the magnetic lines of the negative-stiffness superconducting coil are in an expanded state outside the semi-closed space of the proof mass; a vertical magnetic repulsive force applied to the proof mass by the negative-stiffness superconducting coil varies proportionally to a displacement of the proof mass from an equilibrium position, with the direction of the varied magnetic repulsive force the same as the displacement direction, contributing a negative stiffness to the mass-spring oscillator; the positive-stiffness superconducting coil is mounted in the semi-closed space of the proof mass, and a vertical magnetic repulsive force applied to the proof mass by the positive-stiffness superconducting coil varies proportionally to the displacement of the proof mass from the equilibrium position, with the direction of the varied magnetic repulsive force opposite to the displacement direction, contributing a positive stiffness to the mass-spring oscillator; and a stiffness of the mass-spring oscillator is adjusted by currents in the negative-stiffness superconducting coil and the positive-stiffness superconducting coil, and the stiffness of the mass-spring oscillator determines a natural frequency of the mass-spring oscillator.

It should be noted that the direction of magnetic forces supplied by both the positive-stiffness superconducting coil and the negative-stiffness superconducting coil are opposite to the direction of the gravity, and thus the positive-stiffness superconducting coil and the negative-stiffness superconducting coil are jointly used to levitate the proof mass. But the force variation direction of the positive-stiffness superconducting coil is opposite to the displacement direction of the proof mass relative to the equilibrium position, and the force variation direction of the negative-stiffness superconducting coil is the same as the direction of the displacement of the proof mass relative to the equilibrium position.

It can be understood that the natural frequency of the mass-spring oscillator can be adjusted by controlling currents in the negative-stiffness superconducting coil and the positive-stiffness superconducting coil to achieve adjustability of the natural frequency of the mass-spring oscillator. For example, the total stiffness of the mass-spring oscillator is reduced by increasing the negative stiffness of the mass-spring oscillator to obtain a mass-spring oscillator with a low natural frequency.

Optionally, when the proof mass moves, volumes of the compressed and expanded parts of the magnetic lines of the negative-stiffness superconducting coil vary, and magnetic field energy of the negative-stiffness superconducting coil varies accordingly, so that the magnetic repulsive force between the negative-stiffness superconducting coil and the proof mass exhibits a negative stiffness property at suitable parameters.

A magnetic repulsive force of a superconducting coil acting on the proof mass is $F=-dE(x)/dx$, and the resulting stiffness is $k=d^2E(x)/dx^2$, where x represents a vertical displacement of the proof mass, and E(x) represents magnetic field energy of the superconducting coil.

Optionally, the magnetic forces between the superconducting coils and the proof mass are determined by the following method: in the finite element numerical calculation, the continuously distributed screening current is dispersed into a plurality of current loops $I_i(i=1, 2 \ldots n)$ on a surface of the superconductor, and a mutual inductance $M_{ij}(i, j=1, 2 \ldots n, i \neq j)$ between any two screening current loops, a mutual inductance $M_{i0}(i=1, 2 \ldots n)$ between the respective screening current loop and the superconducting coil and a self-inductance $L_i(i=1, 2 \ldots n)$ of the respective screening current loop are respectively calculated. The Meissner effect of the superconductor requires that the magnetic flux of each screening current loop is zero after a current $I_0$ is injected into the superconducting coil, so that n equations can be established:

$$\Phi_1 = L_1 I_1 + M_{10} I_0 + \sum_{j \neq 1} M_{1j} I_j = 0$$

$$\ldots$$

$$\Phi_i = L_i I_i + M_{i0} I_0 + \sum_{j \neq i} M_{ij} I_j = 0$$

$$\ldots$$

$$\Phi_n = L_n I_n + M_{n0} I_0 + \sum_{j \neq n} M_{nj} I_j = 0.$$

where $\Phi_i$ represents the magnetic flux of the i-th screening current loop, by numerically solving the equations, the currents of n current loops are obtained, and then according to Biot-Safar's law and Ampere's theorem, the magnetic forces between the superconducting coils and the proof mass are obtained in a case where the displacement of the proof mass and the currents of the superconducting coils are given.

Optionally, the negative-stiffness superconducting coils and the positive-stiffness superconducting coil may each comprise a plurality of sets of superconducting coils.

Optionally, the positive-stiffness superconducting coil may be one or more single-layer tightly wound disc type superconducting coils.

Optionally, the negative-stiffness superconducting coil may be one or more solenoid coils.

Optionally, one or more sets of horizontal-degree-of-freedom superconducting coils are further included; the magnetic isolation of the horizontal-degree-of-freedom superconducting coils from the negative-stiffness superconducting coil and the positive-stiffness superconducting coil disposed in the barrel is achieved by utilizing the perfect diamagnetism of the superconducting proof mass, thereby suppressing the cross-coupling effect of horizontal and vertical degrees of freedom; each set of horizontal-degree-of-freedom superconducting coils contains two coils with the same parameters, the two coils are mounted opposite to each other, and forces of the two coils applied to the proof mass are collinear in a horizontal direction, but in an opposite direction; magnetic repulsive forces between the horizontal-degree-of-freedom superconducting coils and the proof mass steadily balance the proof mass at a center position to maintain stable levitation of the proof mass, and the horizontal-degree-of-freedom superconducting coils also constitutes a horizontal-degree-of-freedom mass-spring oscillator capable of measuring two-horizontal-degrees-of-freedom acceleration and performing feedback control on a horizontal displacement of the proof mass, further suppressing the cross-coupling effect of horizontal and vertical degrees of freedom.

It can be understood that the stiffness generated by the horizontal-degree-of-freedom coil can limit the horizontal-degree-of-freedom motion of the proof mass, further reducing cross-coupling.

In general, by comparing the above technical solution of the present inventive concept with the prior art, the present disclosure has the following beneficial effects.

In view of the disadvantage of high natural frequency when a vertical superconducting magnetic mass-spring oscillator is constructed by using a barrel-type superconducting proof mass and a single-layer tightly wound disc type superconducting coil, the present disclosure provides a new oscillator structure, which can reduce the natural frequency of the mass-spring oscillator, make it adjustable within a certain range, and has the advantage of small cross coupling. The mass-spring oscillator with such structure can be used to construct a cross-coupled high-resolution vertical superconducting accelerometer, and then to construct a high-resolution superconducting gravity measuring instrument and a superconducting inertial sensor.

The main technical effect of the present disclosure is that the negative-stiffness superconducting coil is constructed by utilizing a proof mass containing a semi-closed space and is used in combination with the positive-stiffness superconducting coil, so that the natural frequency of the mass-spring oscillator can be adjusted by controlling currents in the negative-stiffness superconducting coil and the positive-stiffness superconducting coil to achieve adjustability of the natural frequency of the mass-spring oscillator. For example, the total stiffness of the mass-spring oscillator is reduced by increasing the negative stiffness of the mass-spring oscillator to obtain a mass-spring oscillator with a low natural frequency.

The present disclosure constructs a vertical superconducting magnetic mass-spring oscillator whose natural frequency is low and adjustable within a certain range to meet the requirement of low frequency signal measurement; and meanwhile, a horizontal-degree-of-freedom coil which is magnetically isolated from the sensitive-degree-of-freedom coil is disposed adjacent to the outer side surface of the proof mass, thereby suppressing the horizontal-degree-of-freedom motion of the proof mass, and reducing the cross-coupling effect.

DETAILED DESCRIPTION OF THE EMBODIMENTS

Figure 1:
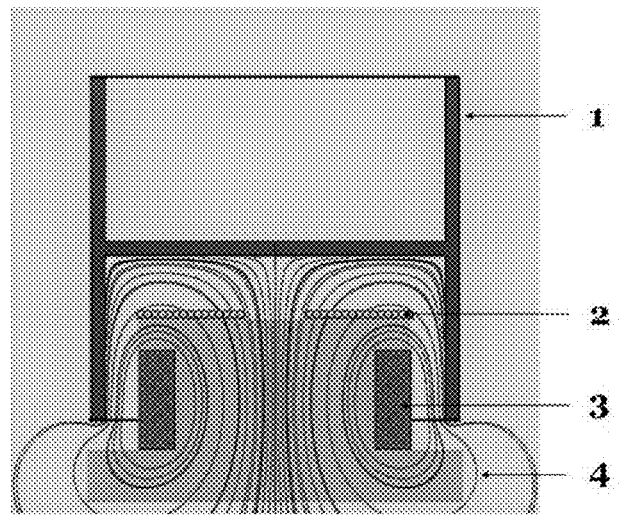
FIG. 1 is a schematic structural diagram of a superconducting magnetic mass-spring oscillator according to the present disclosure.

For clear understanding of the objectives, features and advantages of the present disclosure, detailed description of the present disclosure will be given below in conjunction with accompanying drawings and specific embodiments. It should be noted that the embodiments described herein are only meant to explain the present disclosure, and not to limit the scope of the present disclosure. Furthermore, the technical features related to the embodiments of the disclosure described below can be mutually combined if they are not found to be mutually exclusive.

The basic feature of the vertical superconducting magnetic mass-spring oscillator proposed by the present disclosure is that multiple sets of superconducting coils interacting with the superconducting proof mass are disposed, in which vertical magnetic repulsive forces applied to the proof mass by at least one set of superconducting coils vary proportionally to the displacement of the proof mass from the equilibrium position, with the variation direction the same as the displacement direction, and the at least one set of superconducting coils contribute a negative stiffness to the mass-spring oscillator, and is a superconducting coil group with the negative stiffness property; vertical magnetic repulsive forces applied to the proof mass by the other superconducting coils vary proportionally to the displacement of the proof mass from the equilibrium position, with the variation direction opposite to the displacement direction, and the other superconducting coils contribute a positive stiffness to the mass-spring oscillator, and is a superconducting coil group with the positive stiffness property.

In the superconducting coil group with the negative stiffness property according to the present disclosure, an axisymmetric superconductor having a semi-enclosed space in geometric shape (e.g., a barrel with one end closed and the other end opened) is adopted as a proof mass, and a superconducting coil also having the axisymmetric property is mounted at an opening of a semi-closed space of the proof mass, so that a part of magnetic lines of the surrounding current-carrying superconducting coil winding are in a compressed state in the semi-closed space, and the other part are in an expanded state outside the semi-closed space.

Specifically, the compression state of the magnetic lines in the semi-closed space varies with the vertical movement of the proof mass. Under suitable parameters, the vertical magnetic repulsive force applied to the proof mass by the superconducting coil varies proportionally to the increase of the displacement of the proof mass from the equilibrium position, with the force direction the same as the displacement direction. The negative-stiffness superconducting coil is used to partially cancel the stiffness generated by the positive-stiffness coil to reduce the natural frequency of the mass-spring oscillator.

The present disclosure further proposes that when the mass-spring oscillator includes superconducting coils that respectively contribute positive and negative stiffness, and according the characteristic that the positive and negative stiffness values contributed by the two types of superconducting coils are increased with the increase in coil current, the stiffness of the mass-spring oscillator can be adjusted by currents in the two types of superconducting coils without changing the structure of the oscillator to achieve the purpose of adjusting the natural frequency. The working principle and technical features of the superconducting magnetic mass-spring oscillator according to the present disclosure are described in detail below.

The magnetic interaction forces between the superconducting coils and the superconducting proof mass are derived from the perfect diamagnetism of the superconductor. When the Meissner-state superconducting proof mass is located in an external magnetic field, a superconducting screening current is spontaneously generated in the near surface characterized by the penetration depth, and is subjected to a force (Ampere's force) in the magnetic field, which belongs to a basic physical phenomenon of the magnetic repulsive force applied to the superconducting proof mass.

For the oscillator structure in which both the proof mass and the superconducting coils have the axisymmetric property, the directions of the magnetic forces are parallel to the symmetric axis, and the sizes of the magnetic forces can be obtained by the principle of virtual work, and are expressed by $F=-dE(x)/dx$, where $E(x)$ represents a magnetic field energy of the system when the displacement of the proof mass is x. Usually another equivalent method can also be used to calculate the magnetic force. The effective inductance of the superconducting coil is defined as $L_{eff}=\Phi/I$, where $\Phi$ represents the total magnetic flux of the superconducting coil, which is a sum of a magnetic flux generated by the coil current and a magnetic flux generated by the screening current of the proof mass, and I represents the intensity of the superconducting current in the coil. The effective inductance is a function of the relative position of the coil and the proof mass, which is independent of I. When the intensity of the coil current is constant, the magnetic repulsive force between the coil and the proof mass is:

$$F(x) = -\frac{1}{2}\frac{dL_{eff}(x)}{dx}I^2 \quad (1)$$

where x represents the displacement of the proof mass relative to the coil. The dependence of the effective inductance on the displacement can be directly measured by experiment or calculated by the finite element method.

FIG. 1 is a schematic structural diagram of a superconducting magnetic mass-spring oscillator according to the present disclosure. As shown in FIG. 1, the superconducting magnetic mass-spring oscillator includes: a proof mass 1, a single-layer tightly wound disk type superconducting coil 2 and a solenoid superconducting coil 3, in which the proof mass 1 is a semi-closed barrel with an intermediate partition; the single-layer tightly wound disk type superconducting coil 2 is mounted near the intermediate partition of the proof mass 1 and is located in the semi-closed space of the proof mass, and the solenoid superconducting coil 3 is mounted at an opening of the semi-closed space of the proof mass, so that with a part of magnetic lines 4 of the solenoid superconducting coil 3 are in a compressed state in the semi-closed space of the proof mass, and the other part of the magnetic lines 4 are in an expanded state outside the semi-closed space of the proof mass.

Specifically, the proof mass 1, the single-layer tightly wound disk type superconducting coil 2 and the solenoid superconducting coil 3 are made of superconducting material, and magnetic repulsive forces between the single-layer tightly wound disk type superconducting coil 2 and the solenoid superconducting coil 3 and the proof mass 1 balance the gravity of the proof mass 1 to allow magnetic levitation of the proof mass 1. The magnetic repulsive forces are a function of displacement of the proof mass 1, and a resultant force of the magnetic forces and the gravity of the proof mass has the property of restoring force.

A vertical magnetic repulsive force applied to the proof mass 1 by the solenoid superconducting coil 3 varies with the displacement of the proof mass from the equilibrium position, and the magnitude of varied force is proportional to the displacement of the proof mass from the equilibrium position, and the direction of the varied force is the same as the displacement direction, contributing a negative stiffness to the mass-spring oscillator. Therefore, the solenoid superconducting coil 3 may be referred to as a negative-stiffness superconducting coil.

A vertical magnetic repulsive force applied to the proof mass by the single-layer tightly wound disk type superconducting coil 2 varies with the displacement of the proof mass from the equilibrium position, and the magnitude of the varied force is proportional to the displacement of the proof mass from the equilibrium position, and the direction of the varied force is opposite to the displacement direction, contributing a positive stiffness to the mass-spring oscillator. Therefore, the single-layer tightly wound disk type superconducting coil 2 may be referred to as a positive-stiffness superconducting coil.

The stiffness of the mass-spring oscillator is adjusted by currents in the single-layer tightly wound disk type superconducting coil 2 and the solenoid superconducting coil 3, and the stiffness of the mass-spring oscillator determines its natural frequency. Therefore, the natural frequency of the mass-spring oscillator can be adjusted by controlling currents in the single-layer tightly wound disk type superconducting coil 2 and the solenoid superconducting coil 3 to achieve adjustability of the natural frequency of the mass-spring oscillator. For example, the total stiffness of the mass-spring oscillator is reduced by increasing the negative stiffness of the mass-spring oscillator to obtain a mass-spring oscillator with a low natural frequency.

Taking as an example the interaction force between the barrel (i.e., the proof mass) with the intermediate partition and the disk type superconducting coil shown in FIG. 1, the working principle of the vertical superconducting magnetic mass-spring oscillator is described. When the mass-spring oscillator is constructed, the proof mass is placed coaxially with the superconducting coil, with the axis parallel to the plumb line and the superconducting coil placed below the partition in the barrel.

It should be noted that the negative-stiffness superconducting coil and the positive-stiffness superconducting coil are used to measure the vertical acceleration, and thus may also be referred to as a sensitive-degree-of-freedom coil.

Figure 2:
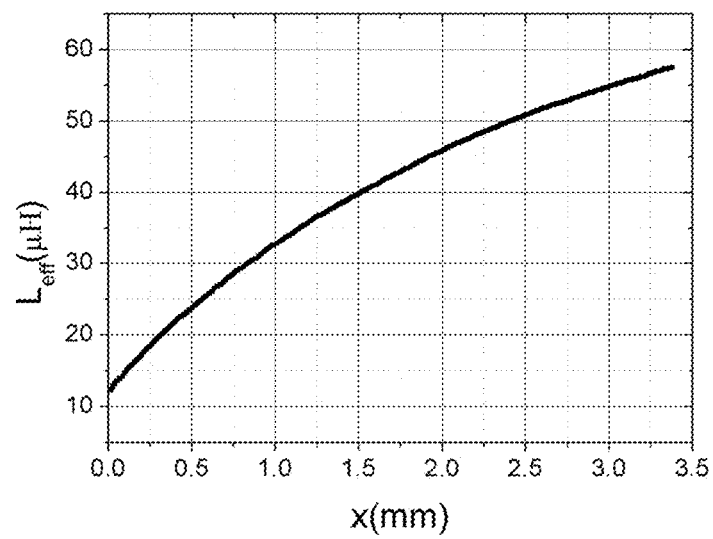
FIG. 2 is a schematic diagram showing the dependence of the effective inductance of a single-layer tightly wound disk type coil of 100 turns on an axial displacement of the proof mass according to the present disclosure.

FIG. 2 shows the experimental measurement of the dependence of an effective inductance $L_{eff}$ of a single-layer tightly wound disk type superconducting coil wound by 100 turns of 36 # niobium wire on a levitation height x of the proof mass, in which the proof mass is a barrel with an inner diameter of 47.5 mm. If the proof mass is levitated by only the single-layer tightly wound disk type superconducting coil, a relationship between the magnetic repulsive force and the displacement at different currents can be calculated by the equation (1) according to the dependence of the effective inductance on the axial displacement of the proof mass.

Figure 3:
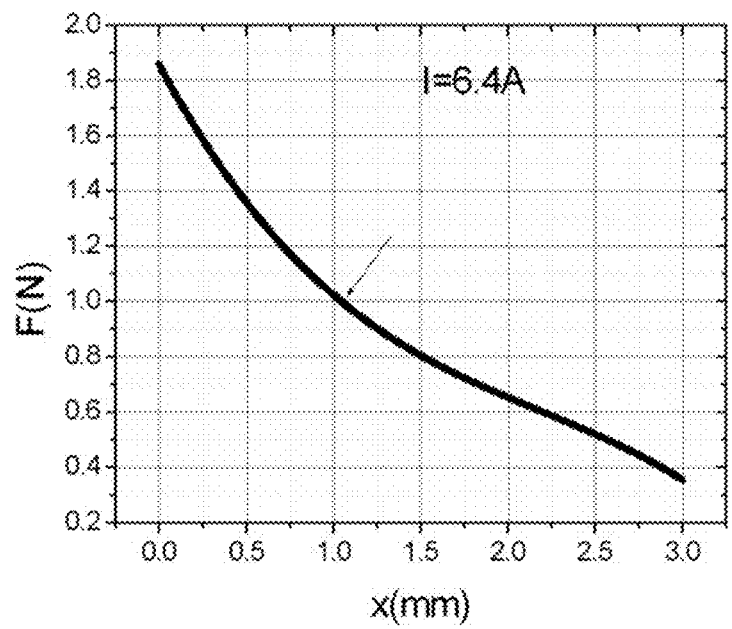
FIG. 3 is a schematic diagram showing the dependence of the magnetic repulsive force of the single-layer tightly wound disk type coil of 100 turns on the axial displacement of the proof mass according to the present disclosure.

FIG. 3 shows a result in a case of a constant coil current of 6.4 A. Magnetic forces of the proof mass at different levitation heights are measured, and the magnetic force decreases with the increase of the levitation height. That is, when the proof mass moves upward and deviates from the equilibrium position so that the distance between the coil and the proof mass increases, the magnetic repulsive force decreases, and the resultant force of the gravity and the magnetic force applied to the proof mass has a downward direction, which is opposite to the displacement direction of the proof mass, and has the property of restoring force. Therefore, a vertical mass-spring oscillator is formed by using the current-carrying single-layer tightly wound disk type superconducting coil to suspend the proof mass.

The natural frequency of the mass-spring oscillator is determined by the stiffness of the oscillator and the mass of the proof mass: $f_0=\sqrt{k/m}/2\pi$, and $k=-dF(x)/dx$, where F represents the magnitude of the restoring force of the vibrator, and m represents the mass of the proof mass. In a case of levitating the proof mass by only the disk type coil, the mass of the proof mass is taken to 100 g, and FIG. 3 shows a relationship between the magnetic force and the displacement of the proof mass when the levitation position of the proof mass is around x=1 mm, in which the stiffness k is about 560 N/m, and the natural frequency of the mass-spring oscillator is about 12 Hz. This is the estimation result when the coil current is constant. In fact, when constructing a superconducting magnetic mass-spring oscillator, it is generally necessary to connect the coil with a superconducting wire into a loop (FIG. 4), thereby utilizing the zero resistance characteristic of the superconducting circuit, so that the superconducting current is permanently maintained after the injection without the need for an external power supply. In this case, when the proof mass moves upward and deviates from the equilibrium position, the effective inductance of the coil increases (see FIG. 2). Due to the zero resistance characteristic of the superconducting loop, the total flux is conserved, and the current in the loop spontaneously decreases. Since the magnetic levitation force is proportional to the square of the current, the magnetic levitation force is much smaller than that in a case of a constant current, meaning that the resultant force of the gravity and the magnetic force with the restoring force property will increase. Therefore, the stiffness of the magnetic spring is larger than that in the case of the constant current, and the natural frequency of the oscillator is higher. In many practical applications such as construction of a time-varying gravimetric instrument, the mass-spring oscillator is required to have a lower natural frequency.

Figure 4:
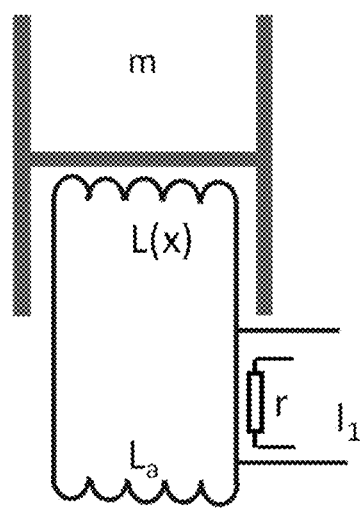
FIG. 4 is a schematic diagram showing the structure in a case where an inductance which does not interact with the proof mass is connected in series in the superconducting loop to reduce the effect of increased stiffness due to current change according to the present disclosure.

In one possible example, one or several superconducting coils are connected in series in the loop to reduce the effect of increased stiffness due to current change, so that the stiffness of the magnetic spring after forming the loop is close to that in the case of the constant current. With reference to FIG. 4, L(x) is a superconducting coil that magnetically interacts with the proof mass, and its effective inductance varies with the displacement of the proof mass. $L_a$ does not interact with the proof mass, and its inductance value is constant. r is a thermal resistance for injecting a superconducting current $I_1$ into the superconducting loop. When the total inductance of the superconducting coil incorporated in the superconducting loop is $L_a$, the expression of the stiffness of the magnetic spring is:

$$k = \frac{I_1^2}{L_0 + L_a}\left[\frac{dL_{eff}(x)}{dx}\right]^2 - \frac{I_1^2}{2}\frac{d^2L_{eff}(x)}{dx^2} \quad (2)$$

where the first item $$\frac{I_1^2}{L_0 + L_a}\left[\frac{dL_{eff}(x)}{dx}\right]^2$$

represents the contribution of current change to stiffness, and the second item $$\frac{I_1^2}{2}\frac{d^2L_{eff}(x)}{dx^2}$$

represents the stiffness in a case of a constant current. $L_0$ represents an effective inductance of the disc type coil that interacts with the proof mass when the proof mass is in an equilibrium position; and $L_a$ represents an inductance of the superconducting coil incorporated in the loop, in which the superconducting coil does not interact with the proof mass and has a constant inductance value. $L_a$ appears in the denominator of the first item in the expression (2), and its function of reducing the stiffness of the magnetic spring is clearly reflected in the expression.

The above discussion shows that when the proof mass is levitated by only the disc type coil, even if a inductance coil that does not interact with the proof mass is incorporated in the superconducting loop, the natural frequency of the mass-spring oscillator is still high, which is not conducive to the construction of a superconducting gravity instrument with low frequency signals (such as a frequency band of 0-1 Hz) as the measurement object.

The present disclosure further proposes that in order to reduce the natural frequency of the mass-spring oscillator, a superconducting coil having the negative stiffness property with respect to the proof mass is additionally introduced. This superconducting coil is used in combination with the above-mentioned positive-stiffness disc type coil to reduce the natural frequency of the mass-spring oscillator. Meanwhile, the natural frequency of the mass-spring oscillator can be adjusted to a required value by controlling currents in the two types of superconducting coils.

Figure 5:
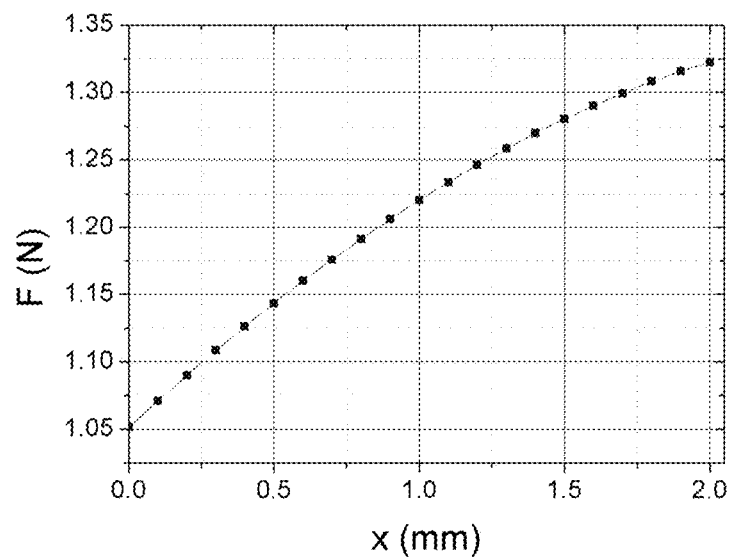
FIG. 5 is a schematic diagram showing a relationship between a magnetic repulsive force of a solenoid coil and a levitation height of the proof mass according to the present disclosure.

The basic method for forming a negative-stiffness superconducting coil according to the present disclosure is as below: a proof mass with a semi-enclosed space (e.g., a circular barrel or square barrel with one end closed and the other end opened) is used, and one or more superconducting coils are mounted near the opening of the semi-closed space of the proof mass, so that when a current is injected into the superconducting coil, a superconducting screening current is spontaneously generated in the surface of the proof mass. The superposition of magnetic fields generated by the coil current and the screening current exhibits the following characteristics: in the semi-closed space of the superconducting proof mass, the magnetic induction intensity is large, and the magnetic lines are in a compressed state; and outside the barrel, the magnetic induction intensity is small, and the magnetic lines are in a expanded state. As shown in FIG. 5, the vertical magnetic repulsive force F applied to the proof mass by the negative-stiffness superconducting coil varies proportionally to the displacement x of the proof mass from the equilibrium position, the variation direction is the same as the displacement direction, contributing a negative stiffness to the mass-spring oscillator.

The magnetic field energy expressed as $E(x)=\iiint(B^2/2\mu_0)dv$ is determined by the spatial distribution of the magnetic induction intensity B, and is mainly contributed by the spatial magnetic field whose magnetic lines are in a compressed state in the barrel-type proof mass. The spatial distribution of the magnetic field depends on the vertical displacement x of the proof mass and is a function of x. The magnetic force applied to the proof mass by the superconducting coil is $F=-dE(x)/dx$, and the resulting stiffness is $k=d^2E(x)/dx^2$. When the proof mass moves, volumes of the compressed part and the expanded part vary, and the magnetic field energy also varies accordingly. Under suitable parameters, the magnetic repulsive force between the superconducting coil and the proof mass can be made to exhibit a negative stiffness property.

Under the guidance of the above construction method for the negative-stiffness superconducting coil, the finite element numerical calculation method can be used to find structural parameters that meet the design requirements, including the geometric shape of the proof mass as well as the geometric parameters and electromagnetic parameters of the superconducting coil. The finite element numerical calculation method for the axisymmetric structure can refer to the prior art, and the key is to calculate the screening current distribution on the surface of the superconductor. In the finite element numerical calculation, the continuously distributed screening current is dispersed into a plurality of current loops $I_i(i=1, 2 \ldots n)$ on the surface of the superconductor, and the mutual inductance $M_{ij}(i, j=1, 2 \ldots n, i \neq j)$ between any two screening current loops, the mutual inductance $M_{i0}(i=1, 2 \ldots n)$ between the respective screening current loop and the superconducting coil, and the self-inductance $L_i(i=1, 2 \ldots n)$ of the respective screening current loop are respectively calculated. The Meissner effect of the superconductor requires that the magnetic flux $\Phi_i(i=1, 2 \ldots n)$ of the i-th screening current loop is zero after a current $I_0$ is injected into the superconducting coil, and thus n equations can be established:

$$\Phi_1 = L_1 I_1 + M_{10} I_0 + \sum_{j \neq 1} M_{1j} I_j = 0$$

$$\ldots$$

$$\Phi_i = L_i I_i + M_{i0} I_0 + \sum_{j \neq i} M_{ij} I_j = 0$$

$$\ldots$$

$$\Phi_n = L_n I_n + M_{n0} I_0 + \sum_{j \neq n} M_{nj} I_j = 0$$

By numerically solving the equations, currents of n current loops are obtained, and then according to Biot-Safar's law and Ampere's theorem, a magnetic force between the superconducting coil and the proof mass is obtained in a case where the displacement of the proof mass and the current of the superconducting coil are given.

The finite element numerical calculation verifies the effectiveness of the present disclosure for constructing a negative-stiffness magnetic spring. An example is given below. A niobium circular barrel with one end closed by a flat plate and the other end opened is used as a superconducting proof mass, which has an inner diameter of 47.5 mm. A solenoid coil is coaxially placed at the open end of the proof mass, and the solenoid coil is placed in the proof mass barrel, with the end face of the coil winding flush with the end face of the proof mass. The solenoid is formed by tightly winding the $\phi 40$ skeleton by 36 # niobium wire in a manner of 5 layers by 50 turns. A current of 4 A is injected into the solenoid and then a relationship curve of the magnetic repulsive force applied to the proof mass and the displacement of the proof mass can be obtained by the finite element method. As shown in FIG. 5, the magnetic repulsive force increases as the displacement of the proof mass increases. When the superconducting coil and the proof mass are placed along the plumb line and the opening of the proof mass is facing downward, the proof mass in a magnetic levitation state is subjected to the constant gravity, the variation of the resultant force of the gravity and the magnetic force will have the same direction as the displacement of the proof mass from the equilibrium position. Therefore, the superconducting solenoid configured in this manner contributes a negative stiffness to the mass-spring oscillator.

Since a mass-spring oscillator that constructs an accelerometer or other inertial sensor must have a positive stiffness, a superconducting coil with the negative stiffness property must be used in combination with a superconducting coil with the positive stiffness property. The negative-stiffness superconducting coil is used to partially cancel the stiffness generated by the positive-stiffness superconducting coil so as to reduce the natural frequency of the mass-spring oscillator. Meanwhile, under the premise of not changing the oscillator structure, the stiffness of the superconducting magnetic mass-spring oscillator is adjusted by adjusting currents of the two types of superconducting coils, so that the natural frequency of the vibrator meets the application requirements.

A method for constructing a typical positive-stiffness superconducting coil is that a superconducting coil is placed in the semi-closed space of the proof mass so that the magnetic lines surrounding the coil are enclosed in the semi-closed space of the proof mass, and thus the superconducting coil exhibits a positive stiffness property. Also, taking as an example the above-described niobium circular barrel proof mass with an inner diameter of 47.5 (one end of which is closed by a flat plate and the other end of which is opened), a single-layer tightly wound disc type superconducting coil made of 36 # superconducting niobium wire is placed 1 mm away from the sealing plate in the barrel as a positive-stiffness coil. The above-described solenoid coil at the opening of the circular barrel is still used a negative-stiffness coil, and this negative-stiffness coil is used in combination with the positive-stiffness coil to achieve the purpose of adjusting the natural frequency of the mass-spring oscillator, as shown in FIG. 1. The finite element calculation results show that when the proof mass is suspended by the two coils, the natural frequency of the vibrator can be adjusted within a range of 0 to 30 Hz by taking different combination values of superconducting currents.

Figure 6:
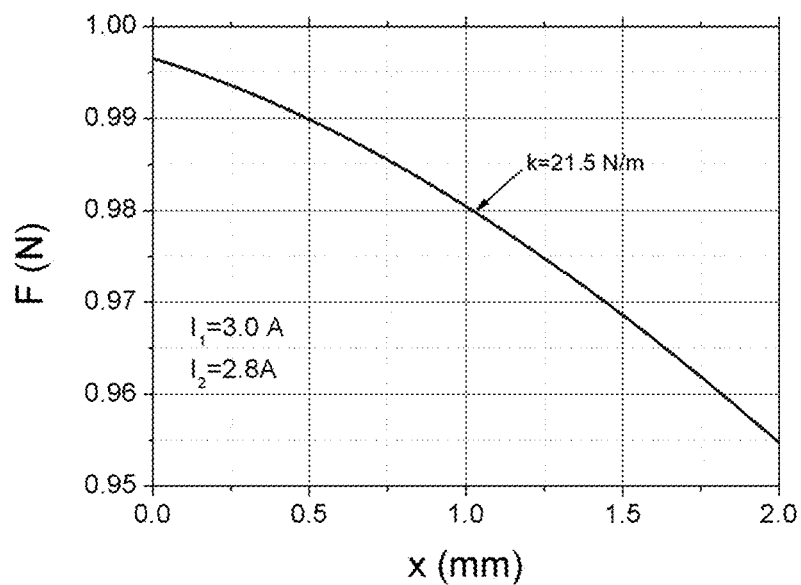
FIG. 6 is a schematic diagram showing the results of stiffness adjustment of the superconducting mass-spring oscillator based on the two superconducting coils shown in FIG. 3 and FIG. 5 according to the present disclosure.

FIG. 6 is a graph showing a resultant force applied to the proof mass by the disc type positive-stiffness coil and the solenoid negative-stiffness coil as a function of displacement of the proof mass when currents of the two coils are respectively 3.0 A and 2.8 A, in which the absolute value of the slope of the curve is the stiffness of the mass-spring oscillator. In a case of a proof mass of 100 g, the levitation height of the proof mass is 1 mm, which is the equilibrium position of the proof mass. At this position, the vibrator has a stiffness of 21.5 N/m and a natural frequency of 2.3 Hz at a constant superconducting coil current.

In the mass-spring oscillator structure according to the present disclosure, the positive-stiffness coil in the vertical sensitive-shaft superconducting coils is placed in the semi-closed space of the proof mass, and correspondingly, the magnetic lines are also enclosed in the semi-closed space of the proof mass; the negative-stiffness superconducting coil is placed at the opening of the semi-enclosed space, and its magnetic lines expand from the interior of the semi-enclosed space toward the space away from the proof mass, as shown in FIG. 1. Therefore, horizontal-degree-of-freedom superconducting coils can be placed adjacent to an outer side surface of the proof mass, and these superconducting coils do not magnetically couple with the sensitive-degree-of-freedom superconducting coils. Taking the circular barrel proof mass as an example, multiple sets of superconducting coils can be placed adjacent to the outer sidewall of the proof mass. Each set of superconducting coils contains two coils with the same parameters, the two coils are mounted opposite to each other, and the forces of the two coils applied to the proof mass are collinear in the horizontal direction, but in the opposite direction. The magnetic repulsive force between the outer sidewall coils and the proof mass steadily balances the proof mass at the center position to maintain stable levitation of the proof mass, and the outer sidewall coils constitute a horizontal-degree-of-freedom mass-spring oscillator capable of measuring two-horizontal-degrees-of-freedom acceleration and performing feedback control on a horizontal displacement of the proof mass, further suppressing the cross-coupling effect of horizontal and vertical degrees of freedom.

In some possible examples, the present disclosure provides several possible specific embodiments:

1) The structure shown in FIG. 1 is adopted, in which the proof mass is an axisymmetric barrel with an intermediate partition, a single-layer tightly wound disc type superconducting coil is coaxially mounted directly below the intermediate partition in the barrel as a positive-stiffness superconducting coil, and a solenoid coil is mounted at the lower opening of the barrel as a negative-stiffness superconducting coil. In addition, the axisymmetric barrel proof mass may be replaced by a barrel with one end closed and the other end opened.

2) A structure similar to that of FIG. 1 is adopted, in which the proof mass is an axisymmetric barrel with an intermediate partition, a single-layer tightly wound disc type superconducting coil is coaxially mounted directly above the intermediate partition in the barrel as a positive-stiffness superconducting coil, and a solenoid coil is mounted at the lower opening of the barrel as a negative-stiffness superconducting coil.

3) A structure similar to that of FIG. 1 is adopted, in which the proof mass is an axisymmetric barrel with an intermediate partition, a single-layer tightly wound disc type superconducting coil is coaxially mounted directly above and below the intermediate partition in the barrel as a positive-stiffness superconducting coil, and a solenoid coil is mounted at the lower opening of the barrel as a negative-stiffness superconducting coil.

4) A structure similar to any of the structures described in 1), 2) and 3) is adopted, in which the solenoid coil is mounted at an upper opening instead of the lower opening.

5) A structure similar to any of the structures described in 1), 2) and 3) is adopted, in which a solenoid coil is additionally mounted at the upper opening, and this solenoid coil and the solenoid coil mounted at the lower opening jointly constitute a negative-stiffness superconducting coil.

6) A structure similar to any of the structures described in 1) to 5) is adopted, in which the single-layer tightly wound disc type positive-stiffness superconducting coil is replaced by a solenoid coil.

7) A structure similar to any of the structures described in 1) to 6) is adopted, in which the solenoid negative-stiffness superconducting coil is replaced by a coil group containing a plurality of solenoids.

It should be noted that those skilled in the art can understand that the solenoid coil or the single-layer tightly wound disc type coil according to the present disclosure is only an example of a superconducting coil, and any technical solution to achieve positive and negative stiffness control of the mass-spring oscillator using other types of superconducting coils should fall within the scope of protection of the present disclosure.

It should be readily understood to those skilled in the art that the above description is only preferred embodiments of the present disclosure, and does not limit the scope of the present disclosure. Any change, equivalent substitution and modification made without departing from the spirit and scope of the present disclosure should be included within the scope of the protection of the present disclosure.

What is claimed is:

1. A vertical superconducting magnetic mass-spring oscillator with an adjustable natural frequency, comprising a proof mass, a negative-stiffness superconducting coil and a positive-stiffness superconducting coil;

the proof mass, the negative-stiffness superconducting coil and the positive-stiffness superconducting coil are all made of superconducting material, and the proof mass is a semi-closed barrel with an intermediate partition; magnetic repulsive forces between the negative-stiffness superconducting coil and the positive-stiffness superconducting coil and the proof mass balance the gravity of the proof mass to allow magnetic levitation of the proof mass; each of the magnetic repulsive forces is a function of displacement of the proof mass, and a resultant force of the magnetic forces and the gravity applied to the proof mass has the property of restoring force;

the negative-stiffness superconducting coil is mounted at an opening of a semi-closed space of the proof mass, so that a part of magnetic lines of the negative-stiffness superconducting coil are in a compressed state in the semi-closed space of the proof mass, and the other part of the magnetic lines of the negative-stiffness superconducting coil are in an expanded state outside the closed space of the proof mass; a vertical magnetic repulsive force applied to the proof mass by the negative-stiffness superconducting coil varies with a displacement of the proof mass from an equilibrium position, with the variation magnitude proportional to the displacement and the variation direction the same as the displacement direction, contributing a negative stiffness to the mass-spring oscillator;

the positive-stiffness superconducting coil is mounted in the semi-closed space of the proof mass, and a vertical magnetic repulsive force applied to the proof mass by the positive-stiffness superconducting coil varies with the displacement of the proof mass from the equilibrium position, with the variation magnitude proportional to the displacement and the variation direction opposite to the displacement direction, contributing a positive stiffness to the mass-spring oscillator; and a stiffness of the mass-spring oscillator is adjusted by currents in the negative-stiffness superconducting coil and the positive-stiffness superconducting coil, and the stiffness of the mass-spring oscillator determines a natural frequency of the mass-spring oscillator.

2. The vertical superconducting magnetic mass-spring oscillator with an adjustable natural frequency according to claim 1, wherein when the proof mass moves, volumes of the compressed and expanded parts of the magnetic lines of the negative-stiffness superconducting coil vary, and magnetic field energy of the negative-stiffness superconducting coil varies accordingly, so that the magnetic repulsive force between the negative-stiffness superconducting coil and the proof mass exhibits a negative stiffness property at suitable parameters;

wherein a magnetic repulsive force of a superconducting coil acting on the proof mass is $F=-dE(x)/dx$, and the resulting stiffness is $k=d^2E(x)/dx^2$, where x represents a vertical displacement of the proof mass, and $E(x)$ represents magnetic field energy of the superconducting coil.

3. The vertical superconducting magnetic mass-spring oscillator with an adjustable natural frequency according to claim 1, wherein the negative-stiffness superconducting coil and the positive-stiffness superconducting coil each comprise a plurality of sets of superconducting coils.

4. The vertical superconducting magnetic mass-spring oscillator with an adjustable natural frequency according to claim 1, wherein the positive-stiffness superconducting coil is one or more single-layer tightly wound disc type superconducting coils.

5. The vertical superconducting magnetic mass-spring oscillator with an adjustable natural frequency according to claim 1, wherein the negative-stiffness superconducting coil is one or more solenoid coils.

6. The vertical superconducting magnetic mass-spring oscillator with an adjustable natural frequency according to claim 1, further comprising one or more sets of horizontal-degree-of-freedom superconducting coils;

the horizontal-degree-of-freedom superconducting coils are located adjacent to an outer side surface of the proof mass; each set of horizontal-degree-of-freedom superconducting coils contains two coils with the same parameters, the two coils are mounted opposite to each other, and forces of the two coils applied to the proof mass are collinear in a horizontal direction, but in an opposite direction;

the horizontal-degree-of-freedom superconducting coils are disposed outside the proof mass barrel, so that the magnetic isolation of the horizontal-degree-of-freedom superconducting coils from the negative-stiffness superconducting coil and the positive-stiffness superconducting coil disposed in the barrel is achieved by utilizing the complete diamagnetism of the superconducting proof mass, thereby suppressing the cross-coupling effect of horizontal and vertical degrees of freedom;

magnetic repulsive forces between the horizontal-degree-of-freedom superconducting coils and the proof mass steadily balance the proof mass at a center position to maintain stable levitation of the proof mass, and the horizontal-degree-of-freedom superconducting coils also constitutes a horizontal-degree-of-freedom mass-spring oscillator capable of measuring two horizontal-degrees-of-freedom accelerations and performing feedback control on a horizontal displacement of the proof mass, further suppressing the cross-coupling effect of horizontal and vertical degrees of freedom.

* * * * *